(12) United States Patent
Kobayashi

(10) Patent No.: US 6,464,397 B2
(45) Date of Patent: Oct. 15, 2002

(54) ULTRATHIN WALLED ROLLING BEARING

(75) Inventor: Umemitsu Kobayashi, Kuwana (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 09/840,294

(22) Filed: Apr. 24, 2001

(65) Prior Publication Data

US 2002/0006238 A1 Jan. 17, 2002

(30) Foreign Application Priority Data

Apr. 24, 2000 (JP) .......................................... 2000-122960

(51) Int. Cl.[7] ................................................ F16C 19/06
(52) U.S. Cl. ........................................ 384/450; 384/523
(58) Field of Search ................................. 384/450, 523, 384/527, 528, 531, 534

(56) References Cited

U.S. PATENT DOCUMENTS 3,647,268 A * 3/1972 Haines ........................ 384/516
5,540,575 A * 7/1996 Takano et al. ............... 384/613
5,860,749 A * 1/1999 Hirakawa et al. ........... 384/492

* cited by examiner

*Primary Examiner*—Lenard A. Footland
(74) *Attorney, Agent, or Firm*—Arent Fox Kintner Plotkin and Kahn

(57) ABSTRACT

An ultrathin walled rolling bearing in which the noise level is reduced and thus the sound characteristics are improved is provided. The rolling bearing is composed of an outer member having in its inner periphery a raceway surface, an inner member having in its outer periphery a raceway surface, a plurality of rolling elements interposed between the raceway surfaces of the outer and inner members, and a cage for circumferentially equi-spacing the rolling elements. In this bearing, the ratio of the diameter DB of the rolling element to the pitch circle diameter PCD of the bearing is equal to or less than 0.03. In addition, the ratio L/M falls within a range of 0.8 to 0.95 in which L is the radial thickness of the cage and M is the radius difference between the inner peripheral surface of the outer member and the outer peripheral surface of the inner member.

6 Claims, 5 Drawing Sheets

ULTRATHIN WALLED ROLLING BEARING

BACKGROUND OF THE INVENTION

1. Field of the Invention

The present invention relates to an ultrathin walled rolling bearing for use in industrial robots, machine tools, medical equipment, and the like.

FIG. 5 illustrates an example of a CT scanner, a kind of medical equipment. As shown in the figure, in this CT scanner, an X-ray beam generated by an X-ray tube unit 20 is radiated toward a subject 23 via a wedge filter 21 for making the X-ray intensity distribution uniform, and a slit 22 for controlling the intensity distribution. The x-ray beam having passed through the subject 23 is received by a detector 24, is thereby converted into an electric signal, and is fed to a computer (not shown). The constituent components including the X-ray tube unit 20, the wedge filter 21, the slit 22, and the detector 24 are attached via a bearing 25 to a rotary platform 27 of substantially cylindrical shape rotatably supported by a stationary platform 26. As the rotary platform 27 is driven to rotate, these components are rotated about the subject 23. In the CT scanner, by driving the X-ray tube unit 20 and the detector 24 opposed to each other to rotate about the subject 23, projection data of the slice planes to be examined in multiple view directions around the subject 23 can be acquired. Then, by execution of an image reconstruction program configured beforehand based on the acquired projection data, a tomographic slice image is obtained.

In this CT scanner, the inner peripheral surface of the stationary platform 26 has a diameter large enough to permit the insertion of the subject 23 (a diameter of approximately 1 meter). Therefore, as the bearing portion 25 provided between the stationary platform 26 and the rotary platform 27, a bearing having a significantly small cross section relative to its diameter, i.e., a so-called ultrathin walled rolling bearing is used. As shown in FIG. 6, the ultrathin walled rolling bearing 25 is composed of an outer member 1' having in its inner periphery a raceway surface 1b', an inner member 2' having in its outer periphery a raceway surface 2b', a plurality of rolling elements 3' (balls are used in the illustrated example) interposed between the raceway surfaces 2b' and 1b' of the inner and outer members 2' and 1', and a cage 4' for circumferentially equally spacing the rolling elements 3'.

Among ultrathin walled rolling bearings, such a large-diameter bearing as has a pitch circle diameter (PCD) greater than 500 mm has its cage 4' formed in a ring-like shape by joining together, for example, brass-based metal plates (segments) each having a circular section by welding. Each segment has a pocket for accommodating the rolling element 3'. This allows the rolling elements 3' to be held circumferentially equidistantly. Between the pocket of the cage 4' and the surface of the rolling element 3' is formed a cage pocket clearance so as to provide flexibility in the mutual movement between them.

In a small-sized bearing, neither the inner peripheral surface nor the outer peripheral surface of the cage makes contact with the inner or outer member. That is, the cage is guided in rotation by the rolling element alone. On the other hand, in a large-diameter ultrathin walled rolling bearing as described above, the cage 4' is guided in rotation by bringing the inner peripheral surface of the cage 4' into contact with the outer peripheral surface of the inner member 2', or bringing the outer peripheral surface of the cage 4' into contact with the inner peripheral surface of the outer member 1'. In this case, the core deviation between the center of rotation of the bearing and that of the cage becomes unduly great. This increases the whirling movement of the cage, which may result in noise.

Moreover, depending upon the state of the inner or outer member and the cage in contact, an undesirable increase in the noise level may possibly occur.

SUMMARY OF THE INVENTION

An object of the present invention is to reduce the noise level of an ultrathin walled rolling bearing and improve the sound characteristics thereof.

To achieve the above object, according to the present invention, an ultrathin walled rolling bearing is provided with an outer member having in its inner periphery a raceway surface, an inner member having in its outer periphery a raceway surface, a plurality of rolling elements interposed between the raceway surfaces of the outer and inner members, and a cage for circumferentially equi-spacing the rolling elements. In this construction, the ratio of the diameter of the rolling element to the pitch circle diameter of the bearing is equal to or less than 0.03, and a ratio L/M falls within a range from 0.8 to 0.95 in which L is a radial thickness of the cage, and M is a radius difference between an inner peripheral surface of the outer member and an outer peripheral surface of the inner member.

Here, the range of the L/M value is wider than in conventional constructions. Accordingly, as compared with the conventional constructions, the radial movement of the cage 4 is restricted properly. This allows the center of rotation of the cage to come close to that of the bearing, and thereby the amount of radial whirling movement of the cage 4 is reduced. Consequently, occurrence of noise due to the whirling movement of the cage can be successfully prevented.

It is preferable that the ratio L/DB of the radial thickness L of the cage to the diameter DB of the rolling element be set to a range of 0.4 to 0.5.

Either or both of the inner and outer peripheral surfaces of the cage may have a lubricant storage portion formed thereon. The lubricant collected on this storage portion allows a sufficient supply of oil to the contact-making portions between the cage and the inner or outer member. Consequently, occurrence of noise due to the friction between the cage and the component making contact therewith can be successfully prevented.

The cage may be made of resin and is thus lighter in weight as compared to a metal-made construction. This makes further reduction in the noise level possible.

Of the outer and inner members, one may be fixed to a rotary platform of a CT scanner rotating about a subject, and the other may be fixed to a stationary platform of the CT scanner. This allows the rotary platform of the CT scanner to be rotatably supported with respect to the stationary platform.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENT

Hereinafter, an embodiment of the present invention will be described with reference to FIGS. 1 to 4.

Figure 1:
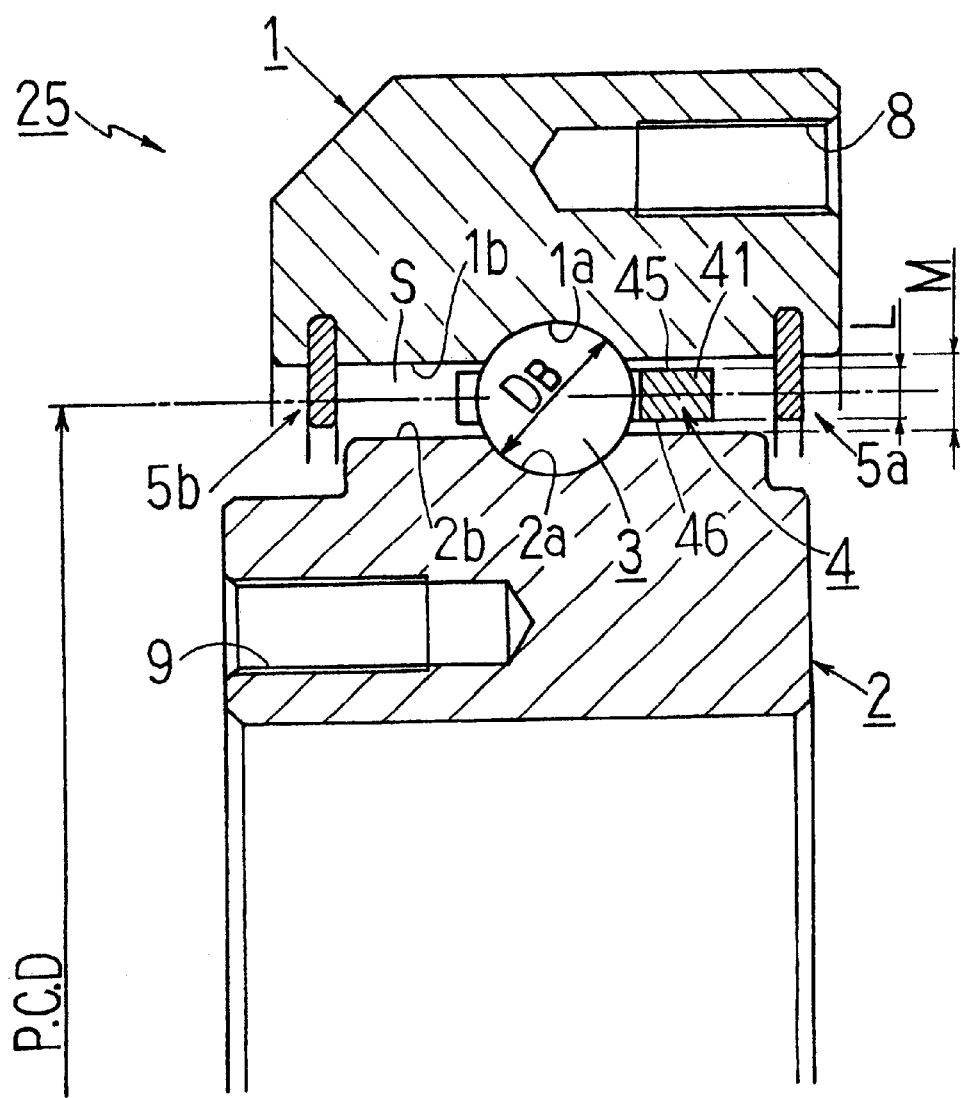
FIG. 1 is a sectional view of an ultrathin walled rolling bearing according to the present invention.
Figure 5:
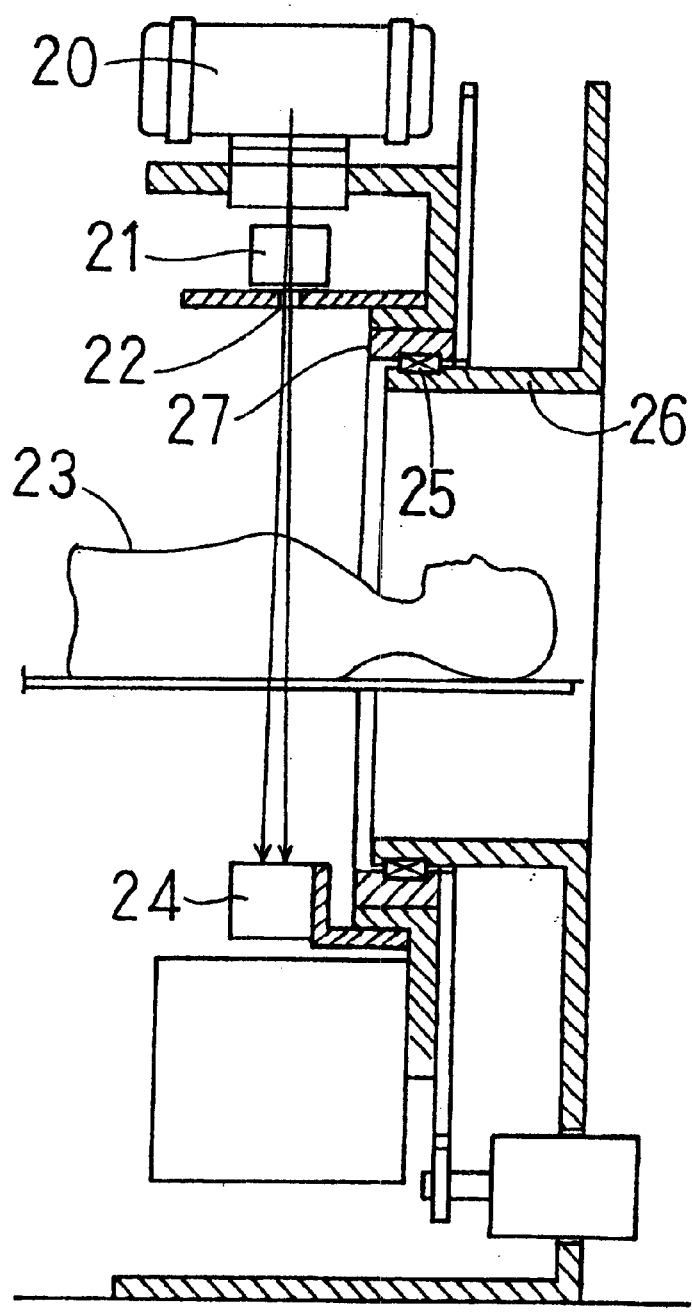
FIG. 5 is a sectional view of a CT scanner.
Figure 6:
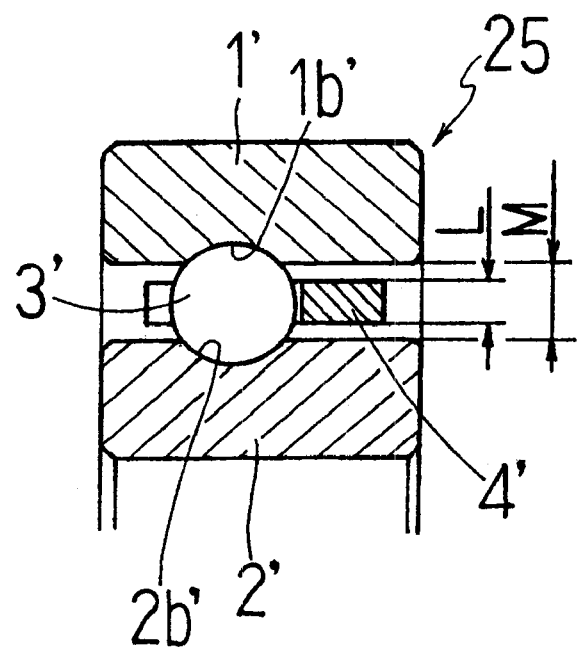
FIG. 6 is a sectional view of a rolling bearing (a ball bearing).

FIG. 1 is a sectional view illustrating a bearing 25, an example of an ultrathin walled rolling bearing, designed for use in the CT scanner shown in FIG. 5. The bearing 25 is mainly composed of a ring-shaped outer member 1, a ring-shaped inner member 2, a plurality of rolling elements 3, a cage 4, and sealing units 5a and 5b. The ring-shaped outer member 1 has in its inner periphery a single-row raceway surface 1a. The ring-shaped inner member 2 is concentrically arranged on the inner periphery side of the outer member 1, and has in its outer periphery a single-row raceway surface 2a. The plurality of rolling elements 3 are interposed in the form of a single row between the raceway surfaces 1a and 2a of the outer and inner members 1 and 2. The cage 4 holds the rolling elements 3 circumferentially equidistantly. The sealing units 5a and 5b seal openings formed at both ends of the bearing in a non-contacting manner. Although the example shown in the figure employs a ball as the rolling element 3, it is also possible to use instead a roller.

The bearing 25 is built as an ultrathin walled rolling bearing in which the ratio φ of the diameter DB of the ball 3 to the pitch circle diameter PCD is equal to or less than 0.03 (φ=DB/PCD≦0.03). Specifically, the ball diameter is set at ½ inch (12.7 mm), the PCD is set at 1041.4 mm, and the diameter ratio φ therebetween is set at 0.012. The present invention is applied principally to such a large-diameter bearing as has PCD of about 500 mm to 1500 mm.

The outer member 1 has on the end surface of its one end (the right-hand side in the drawing) a mounting hole 8. By screwing a fastening means (not shown), such as a bolt, into the mounting hole 8, the outer member 1 is fixed to the rotary platform 27 of the CT scanner shown in FIG. 5. Similarly, the inner member 2 has on the end surface of its one end (the left-hand side in the drawing) a mounting hole 9. By screwing a fastening means (not shown), such as a bolt, into the mounting hole 9, the inner member 2 is fixed to the stationary platform 26. In this way, the outer member 1 serves as a rotary member that rotates together with the rotary platform 27, and the inner member 2 serves as a non-rotating stationary member. Depending upon the structure of the CT scanner, the outer member 1 and the inner member 2 may be arranged in the place of each other.

Figure 2:
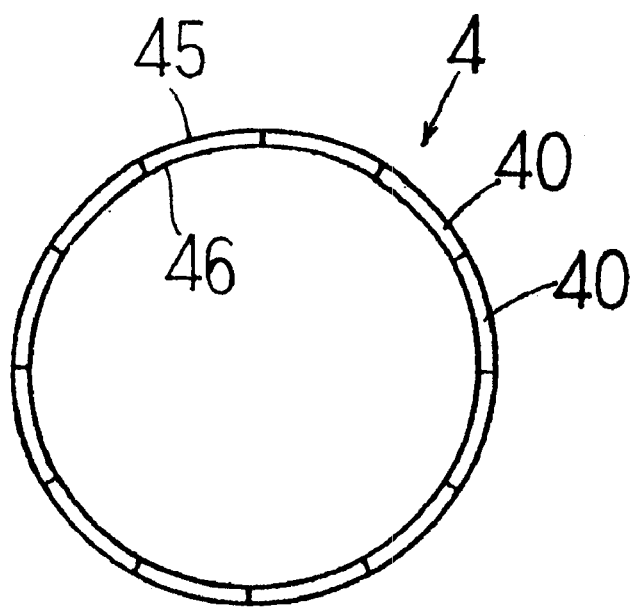
FIG. 2 is a front view of a cage.
Figure 3:
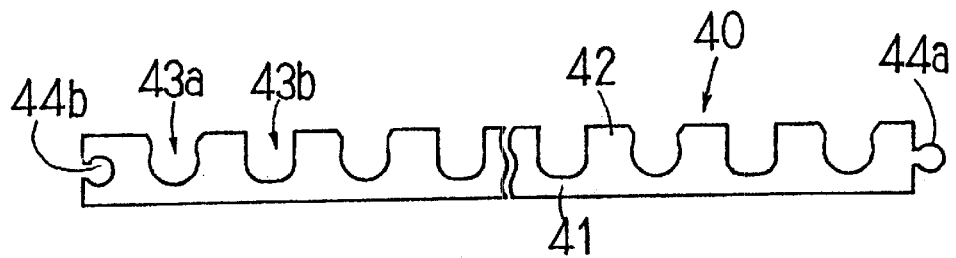
FIG. 3 is an unfolded plan view of a segment constituting the cage.

The cage 4, in contrast to conventional metal-made constructions, is made of a resin material. As shown in FIG. 2, this resin-made cage 4 is of a split type that is formed in a ring-like shape by joining circumferentially together a plurality of resin segments 40 each having a circular section. As shown in FIG. 3, each segment 40 has its concave and convex fits 44b and 44a, formed at both ends, fitted to the convex and concave fits 44a and 44b, respectively, formed at both ends of its counterpart. Thus, all of the segments 40 are joined circumferentially together to form a ring-shaped cage 4. The segment 40 employed in the illustrated example is composed of a circular base portion 41 formed by splitting an annular body at its several circumferential positions, columns 42 extending axially in one direction from the base portion 41, and a plurality of pockets 43a and 43b each formed between adjacent columns 42.

The pockets 43a and 43b of the illustrated example are shaped differently from each other, of which the former functions as a first pocket 43a for retaining the ball 3 as well as for equally spacing them, and the latter functions as a second pocket 43b only for equally spacing the ball 3. In the cage 4 of the embodiment, these two kinds of pockets 43a and 43b are alternately arranged circumferentially equidistantly.

Figure 4A:
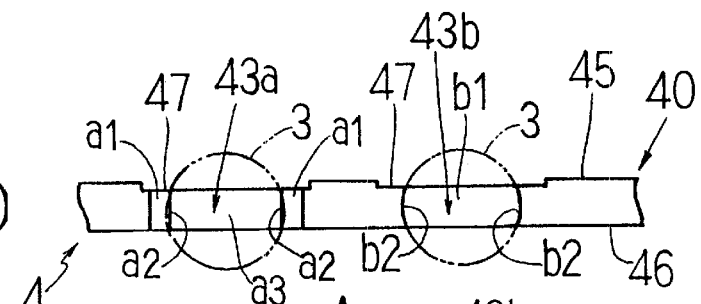
FIGS. 4(A)–4(B) are enlarged views of the pockets of the cage, with FIG. 4(A) showing the construction taken in the direction of arrow A of FIG. 4(B), and FIG. 4(B) being an unfolded plan view thereof.
Figure 4B:
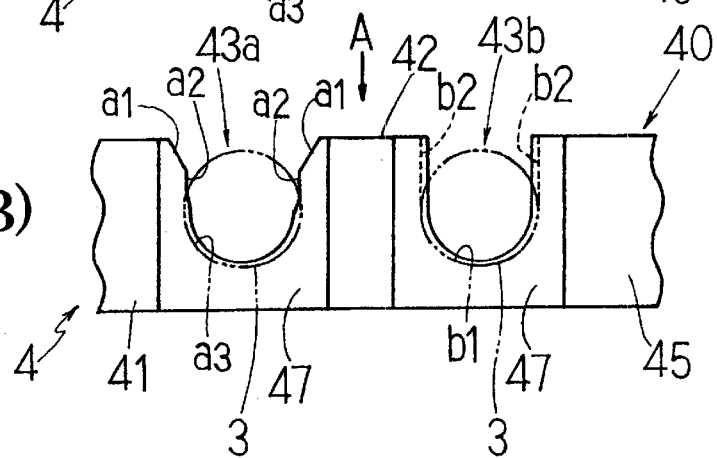

As seen from FIG. 4 showing an enlarged view of the cage pocket (FIG. 4(A) is a front view of the construction taken in the A direction of FIG. 4(B), and FIG. 4(B) is a plan view thereof), the first pocket 43a is composed of, from the opening side, for example, a pair of tapered portions a1 shaped such that the clearance between their opposite surfaces becomes gradually greater toward the opening side; a pair of axially extending straight portions a2; and a concave spherical portion a3 having a curvature which is slightly greater than that of the ball 3. The tapered portion a1 and the straight portion a2 are each formed as a radially extending flat surface. The clearance between the pair of straight portions a2 is made slightly smaller in diameter than the ball 3. This allows the straight portions a2 to serve to inhibit the coming-off of the ball 3 toward the opening side of the pocket, and consequently the ball 3 is held inside the pocket 43a (called the ball retaining function).

On the other hand, the second pocket 43b is composed of, for example, a concave spherical portion b1 having a curvature which is slightly greater than that of the ball 3, and a pair of cylindrical portions b2 extending axially and tangentially from the spherical portion b1. The ball 3 accommodated inside the second pocket 43b is axially movable. Accordingly, the second pocket 43b, in contrast to the first pocket 43a having the ball 3 retaining function, functions only for equally spacing the ball 3.

The ball 3 is inserted into the pocket 43a (or 43b) from the opening thereof, and is pushed until it strikes the bottom side of the pocket and thus the ball 3 is fully accommodated therewithin. Whereas the first pocket 43a needs to have its tapered portions a1 pushed open to receive the ball 3, the second pocket 43b can receive it without such action. This helps simplify the process of including the balls 3 in the cage 4.

Note that the shapes and the configurations of the pockets 43a and 43b described above are merely examples of how the present invention can be applied. For example, two pockets of an identical shape, or those of any shape and configuration can also be adopted in accordance with the operating conditions or other requirements concerning the bearing.

In any of the first and second pockets 43a and 43b, between the surface of the ball 3 and the inner surface of the pocket is provided a cage pocket clearance. This allows, during the rotation of the bearing, the cage 4 to be radially moved relative to the ball 3. With this relative movement, the cage 4 is brought into contact with one of the outer peripheral surface 2b of the inner member 2 and the inner peripheral surface 1b of the outer member 1, thereby guiding the cage 4 in rotation. This embodiment deals with the case where the outer peripheral surface 45 of the cage 4 makes contact with the inner peripheral surface 1b of the outer member 1. In this case, the cage 4 receives driving force from the outer member 1 making contact therewith and is thereby driven to rotate.

In the construction embodying the present invention, the ratio L/M of the radial thickness L of the cage 4 to the space dimension M represented as the radius difference between the inner peripheral surface 1b of the outer member 1 and the outer peripheral surface 2b of the inner member 2 is set to a range of 0.8 to 0.95 (0.8≦L/M≦0.95). This range is wide enough to restrict the radial movement of the cage 4 compared with the L/M value ranging from 0.5 to 0.7 set for conventional constructions. This allows the center of rotation of the cage 4 to come close to that of the bearing and thus helps reduce the amount of radial whirling movement of the cage 4. Consequently, it is possible to prevent occurrence of noise due to the whirling movement of the cage 4 and thereby improve the sound characteristics. Moreover, as described previously, using a light-weight cage 4 made of resin makes further reduction in the noise level possible.

The reason why the L/M value is set to fall within the above-described range is as follows. If the L/M value is less than 0.8, it is impossible to suppress the whirling movement of the cage 4 sufficiently and thus obtain improved sound characteristics. In contrast, if the L/M value is greater than 0.95, the cage 4 frequently makes contact with the outer member 1, and this may lead to deterioration of lubricity of the portions in contact.

Here, it is preferable that the ratio of the radial thickness L of the cage 4 to the diameter DB of the ball 3 be set to a range of 0.4 to 0.5 ($0.4 \leq L/DB \leq 0.5$). Note that the value L/DB is less than 0.4 in conventional constructions.

To obtain satisfactory sound characteristics, the construction embodying the present invention has a storage portion 47 formed around the pockets 43a and 43b of the cage's outer peripheral surface 45 thereof for collecting lubricant, such as grease. This storage portion 47 is formed by partly making hollow the cage's outer peripheral surface 45 around the pockets 43a and 43b. In the example shown in FIG. 4, the storage portion 47 is so formed as to extend over the entire axial length of the cage 4 so that it covers the entire area of the pocket 43a (or 43b). The storage portion 47 is formed on one of the inner and outer peripheral surfaces 46 and 45 of the cage 4 which makes contact at least with the inner member 2 or the outer member 3. Accordingly, in a construction, like that of the embodiment, in which the cage 4 is rotated by bringing it into contact with the outer member 1, as described above, the storage portion 47 needs to be formed at least on the outer peripheral surface 45 of the cage 4. In contrast, in a construction in which the cage 4 is rotated by bringing it into contact with the inner member 2, the storage portion 47 needs to be formed at least on the inner peripheral surface 46 of the cage 4. Note that, in either case, the storage portion 47 may be formed on both of the inner and outer peripheral surfaces 46 and 45 of the cage 4.

The storage portion 47 collects grease acting as lubricant during the rotation of the bearing. This allows, when the outer peripheral surface 45 of the cage 4 makes contact with the inner peripheral surface 1b of the outer member 1, a sufficient supply of oil to their portions in contact, as well as to the raceway surfaces 1a and 2a. Consequently, occurrence of noise due to the contact between the cage 4 and the component making contact therewith (in this embodiment, the outer member 1), or the contact between the ball 3 and the raceway surfaces 1a and 2a, can be successfully prevented. This helps improve the sound characteristics.

Note that, although the above description deals with the case where the cage 4 is guided in rotation by bringing its outer peripheral surface 45 into contact with the inner peripheral surface 1b of the outer member 1, the present invention is applicable also to the case where the cage 4 is guided in rotation by bringing its inner peripheral surface 46 into contact with the outer peripheral surface 2b of the inner member 2. In this case, as described above, the storage portion 47 is formed at least on the inner peripheral surface 46 of the cage 4 (may also be formed additionally on the outer peripheral surface 45).

According to the present invention, in this construction, the range of the L/M value is set to be greater than in conventional ones so as to reduce the amount of radial movement of the cage. This allows the center of rotation of the cage to come close to that of the bearing. Consequently, occurrence of noise due to the whirling movement of the cage can be successfully prevented and thus the sound characteristics are improved.

Moreover, either or both of the inner and outer peripheral surfaces of the cage have a lubricant storage portion formed thereon. The lubricant collected on this storage portion allows a sufficient supply of oil to the contact-making portions between the cage and the inner or outer member. Consequently, occurrence of noise due to the friction therebetween can be successfully prevented.

In a CT scanner employing an ultrathin walled rolling bearing as described above that offers improved sound characteristics, it is possible to reduce the noise stress on the subject (patient) under examination.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An ultrathin walled rolling bearing comprising:
    an outer member having in its inner periphery a raceway surface;
    an inner member having in its outer periphery a raceway surface;
    a plurality of rolling elements interposed between the raceway surfaces of the outer and inner members; and
    a cage for circumferentially equi-spacing the rolling elements,
    wherein a ratio of a diameter of the rolling element to a pitch circle diameter of the bearing is equal to or less than 0.03, and
    a ratio L/M falls within a range from 0.8 to 0.95 in which L is a radial thickness of the cage, and M is a radius difference between an inner peripheral surface of the outer member and an outer peripheral surface of the inner member.

2. The ultrathin walled rolling bearing according to claim 1,
    wherein a ratio L/DB of the radial thickness L of the cage to the diameter DB of the rolling element falls within a range from 0.4 to 0.5.

3. The ultrathin walled rolling bearing according to claim 1,
    wherein either or both of the inner and outer peripheral surfaces of the cage have a lubricant storage portion formed thereon.

4. The ultrathin walled rolling bearing according to any one of claims 1–3,
    wherein the cage is made of resin.

5. The ultrathin walled rolling bearing according to claim 4,
    wherein, of the outer and inner members, one is fixed to a rotary platform of a CT scanner rotating about a subject, and the other is fixed to a stationary platform of the CT scanner.

6. The ultrathin walled rolling bearing according to any one of claims 1–3,
    wherein, of the outer and inner members, one is fixed to a rotary platform of a CT scanner rotating about a subject, and the other is fixed to a stationary platform of the CT scanner.

* * * * *